United States Patent Office 2,929,823
Patented Mar. 22, 1960

2,929,823

PRODUCTION OF 5-HYDROXYMETHYL-FURFURAL

John D. Garber, Cranford, and Robert E. Jones, Rahway, N.J., assignors to Merck & Co., Inc., Rahway, N.J., a corporation of New Jersey No Drawing. Application November 26, 1956
Serial No. 624,224

7 Claims. (Cl. 260—347.8)

This invention relates to the production of 5-hydroxymethyl furfural (HMF) from sugar, and has for its object the provision of an improved process for producing HMF from sugars by conversion. The invention provides a continuous process carried out at relatively high temperatures for converting invert sugar, glucose, fructosans, fructose or sucrose and hydrolyzed wood or starch (hereinafter for convenience called sugar) in water solution to HMF that is both rapid and efficient.

Prior investigators have reported the conversion of sucrose to HMF in small batch experiments with acid catalysts, such as dilute mineral acids or organic acids, for example oxalic acid, and at relatively low temperatures. With long conversion times and low yields the processes heretofore disclosed have not been commercially practical. The maximum reported yields have been attained at 162°–167° C. with the HMF falling to zero at 225° C. Humin is one of the products of the conversion reaction and within the temperatures heretofore used it has increased progressively with an increase in temperature and has seriously interfered with the recovery of the HMF.

Humin is a brown to black, fluffy solid almost completely insoluble in water, caustic, acids and organic solvents of all types. It coats the sides of the reaction vessels and serves as an efficient thermal insulator, thereby causing poor heater transfer. It also induces emulsification of the aqueous phase with various extraction solvents and complicates the HMF recovery problem.

This invention is based on our discovery that sugar in aqueous solution can be converted to HMF at temperatures above about 250° C. in high yield, in a short time, without forming humin of the low temperature operations, and with improvements in the efficiency of HMF recovery. The invention, accordingly, provides a continuous process for the conversion of sugar to HMF at temperatures of from 250° C. to about 380° C. and the recovery of the HMF. The invention comprehends a time-temperature relationship in which the time for heating to the upper temperature range can be reduced to a very brief period. In the region of 250° C. to about 380° C. the contact time will be under two minutes in the case of sucrose or invert sugar and may go as low as a tenth or a few hundredths of a second at the higher reaction temperatures.

While the use of a catalyst is not necessary in our process, its use is beneficial in some instances as in the conversion of glucose or solutions predominantly glucose, or when mother liquors are being recycled from which most of the fructose has been removed in conversion to HMF. The efficient conversion of such solutions requires more drastic conditions, including higher temperatures, longer contact times or a catalyst, and to this end we may use the acid catalysts as previously reported, but prefer to use levulinic acid which we have found to be an excellent catalyst.

In carrying out a process of our invention by operating under conditions of substantially higher temperature, i.e. above about 250° C., the formation of humin is practically or entirely eliminated. When contact times or initial sugar concentrations are high a tar forms, not humin. This tar is soluble in many organic solvents, e.g. furfural, ethyl acetate, formamide, dimethyl formamide, dimethyl sulfoxide, and furthermore, is not converted to the insoluble humin even under drastic reaction conditions. In comparison with the formation of humin, this tar is free of the objection of humin in large-scale processing equipment. For example, in a continuous coil reactor, the insoluble humin coats the surfaces and orifices, and plugs the equipment rather quickly. The tar, on the other hand, is quite fluid at the reaction temperature and behaves as would be expected for an emulsion of semi-viscous material in an aqueous system.

In addition to the above advantage, which is of extreme practical importance, the yields of HMF are considerably higher than reported previously. Based on sucrose as a starting material, yields of HMF (based on ultraviolet absorption spectra, which is the basis for a convenient assay procedure) of nearly 40% have been noted in small-scale runs. That is, based on 300 grams of sucrose, one can obtain 88 grams of HMF in one pass through the heating equipment. No allowance for recoverable sugars has been made. This compares with the 48 grams previously reported.

In carrying out a process of the invention, the sugar in water solution with or without the added catalyst is heated rapidly in any suitable apparatus provided with means for continuously passing the sugar solution into the apparatus and removing the reaction products including HMF. The apparatus in its complete embodiment should include means for separating the aqueous phase containing unconverted sugar for cyclic return to the process, the tar-like material and the HMF.

In any practical system for carrying out this reaction, the time and temperature relationship during the heat-up period, reaction period and cool-down phase must be considered. A preferred continuous system for converting the sugars to HMF is one that effects a rapid heat-up to the reaction temperature and rapid cooling or quenching subsequently. Equipment for this purpose which allows the operation to be carried out at atmospheric pressure as well as at elevated temperatures is available. Apparatus particularly suitable for carrying out the process of our invention includes, at least, a pump, a heat source, a reactor, and a pressure release valve. We prefer to use a proportioning pump such as the Hills-McCanna or Milton Roy types, and a back pressure control valve such as the Annin Hammel-Dahl or Mason-Neilan types. The reactor preferably comprises one or more continuous coils of stainless or carbon steel of such diameter as to provide the most effective ratio of heat transfer to solution volume. The back pressure control valve permits the reaction contents to be maintained at any desired high pressure while allowing escape of liquid product at any desired lower pressure, advantageously, at atmospheric pressure. Other equipment which is advantageous for industrial operations includes temperature and pressure regulators of types commercially available.

The means for heating the solution in the reactor is important in connection with controlling the reaction time-temperature relation. It is important to attain the reaction temperature as nearly instantaneously as possible. To this end, one means of rapid heating is achieved by injecting super-heated steam into the sugar solution. The sensible heat of the steam plus the latent heat of condensation effects a rapid elevation in temperature. Another system for rapid heating comprises reactor coils through which the solution passes that are of very small diameter and heated exteriorly in a furnace in the manner of heating a modern high pressure steam boiler. Other means of heating the reactor, such as electricity may be used.

In view of the instability of HMF it is important that it be removed from the reaction mixture as quickly as possible. This may be done by operating continuously in the presence of an extraction solvent such as furfural whereby the aqueous sugar solution and furfural are pumped co- or counter-currently through the reactor. The reaction mixture may be processed in a number of ways including extraction, distillation, adsorption to recover the HMF. It is usually preferable to extract the HMF from the neutralized reaction mixture to separate sugars and other partially dehydrated carbohydrates. The extracting solvent may be water immiscible alcohols, ketones, ethers, esters and halogenated hydrocarbons or their mixtures. We prefer to use furfural since it is ordinarily formed to a small extent in the reactor and hence must be separated from the HMF in any case. The aqueous raffinate resulting from the extraction may be processed to recover trace solvent quantities and then recycled to the reactor, following addition of a suitable catalyst.

The solution containing HMF may be treated with activated carbon to remove impurities and then distilled to recover the HMF.

Since fructose is more easily dehydrated to HMF than is glucose, there are advantages in using solutions of substantially pure fructose in our process. This sugar may be obtained by hydrolysis of the fructosans found in the ti plant, the Jerusalem artichoke, or by separation of invert sugar into its components. For economic advantages one may use cane juice, concentrated can juice, crushed sugar cane slurry, invert or high test molasses, hydrolyzed wood or starch, or the resulting molasses. Blackstrak molasses may also be used.

We have found that when a mixture of glucose or sucrose and fructose is cracked at a temperature around 275° C. the resulting HMF is derived mainly from the fructose and only partly from the glucose or sucrose. The recycled sugars are, therefore, largely glucose or sucrose. In treating such mixtures is is desirable to use the more drastic conditions including the use of a catalyst.

The following examples illustrate operations carried out in accordance with the process of our invention.

Example I

In order to study the high temperature cracking of sugars to furans in the laboratory, a series of capillary tube experiments was run. Tubes of the type ordinarily used in melting point determination were weighed and filled with 40–60 mg. of stock sugar solution. After weighing they were sealed and heated in an oil bath held at constant temperature for the desired time. Then the tubes were quickly removed, plunged into a cold oil bath and the tubes smashed into volumetric flasks. The conversion to HMF was estimated by determining U.V. absorption at 2830 A.

Data obtained from a single run on 40% sucrose in water plus 0.01% levulinic acid at 270° C. are shown below:

| Time in Seconds [1] | U.V. Yield, Based on Sucrose→2 HMF |
| --- | --- |
| 15 | 14.9 |
| 38 | 38.7 |
| 45 | 37.2 |
| 60 | 35.6 |
| 90 | 35.0 |

[1] This is probably not maximum yield since it is difficult to manipulate the tubes at short contact times, when heat-up and cool-down errors become significant.

The peak yields at different reaction temperatures are given below:

| Temperature, °C. | Time, Seconds | Maximum U.V. Yield, Based on Sucrose→ 2 HMF |
| --- | --- | --- |
| 230 | 180 | 35 |
| 250 | 60 | 36 |
| 270 | 45 | 37 |
| 340 | 7 | 31 |

Example II

A tubular reactor was constructed consisting of three 14 ft. lengths of ¼ inc. O.D., 18 gage, No. 316 stainless steel tubing in series, connected to a 30-foot cooling coil. Heat was supplied to the tubing by pumping hot oil through a jacket. Auxiliary equipment consisting of a pressure release valve and pressure and temperature regulators was used.

Water was first pumped through the reactor by a Hills-McCanna Duplex pump set to a give a 43 sec. contact time. When the reaction temperature was 256° C., the pump was switched to a 40% sucrose solution in water containing 0.04% levulinic acid as added catalyst. The dark product containing traces of tarry material but no humin was collected at a uniform rate for an extended period.

Extraction of the reaction mixture with ethyl acetate gave a brown crystalline HMF upon taking to dryness. The yield was 30–31% based on sucrose. The tarry material showed the same analysis as HMF and may be a polymer of some sort:

Analysis—Calc. for $(HMF)_x$ or $(C_6H_6O_3)$=C, 57.2%; H, 4.8%. Found: C, 57.08%; H, 4.53%.

Example III

The equipment and conditions outlined in Example II were used in this example in which furfural was injected into the system at a point immediately following the reaction (heating) zone. This prevented the separation of tars from the reaction mixture in the reaction tubes. On cooling, the furfural layer separated and was worked up to recover HMF. Higher yields of a liquid product that crystallized promptly when cooled to 15° C. was obtained.

Furfural was chosen as a solvent because of its particularly favorable distribution coefficient for HMF in water. The methoxymethyl and ethoxymethyl furfurals may also be used for this purpose.

Example IV

The reactor set-up as described in Example II, using a feed containing 35% sucrose in water plus 0.04% levulinic acid catalyst was pumped into the reactor coils. At 280–285° C. and at a contact time of about thirty seconds, the reaction product was a brown solution, almost free of insoluble tars. When the filtered reaction mixture was assayed (based on U.V. absorption spectra), it showed that 62% of the sugar had been converted to HMF.

The HMF was readily recovered from the reaction mixture by contacting with several volumes of ethyl ether. The solvent was evaporated and the residue distilled in vacuo to yield good quality HMF. That is, the product completely crystallized on cooling and showed a melting point of 30° C.

Example V

A solution of 15 pounds of sucrose was made up in 13,600 cc. of water and no acidic catalyst was added. This solution was pumped through the tubular reactor described in Example No. II in a continuous fashion. The oil temperature in the reactor was 260–265° C. and the contact time was forty seconds.

The dark reactor effluent was rapidly cooled in an ice condenser and, after proper dilution, the amount of HMF produced as shown by U.V. analysis was 38% of theory. The HMF was extracted and isolated in the manner already described.

We claim:

1. The improved continuous process for the conversion of a compound of the group consisting of glucose, fructose, invert sugar, fructosans, sucrose, hydrolyzed wood and starch into 5-hydroxymethyl furfural, which comprises heating an aqueous solution of the compound containing added furfural to a temperature of from 250° C. to 380° C. for from 120 seconds to 0.1 second to form 5-hydroxymethyl furfural in high yield, and separating from the reaction products the 5-hydroxymethyl furfural in solution in the furfural.

2. The improved continuous process for the conversion of a compound of the group consisting of glucose, fructose, invert sugar, fructosans, sucrose, hydrolyzed wood and starch into 5-hydroxymethyl furfural, which comprises heating an aqueous solution of the compound to a temperature in the range of 250° to 380° C. for from 0.1 second to 120 seconds to form 5-hydroxymethyl furfural, forming with the 5-hydroxymethyl furfural a black tar-like material that is fluid at the reaction temperature and soluble in organic solvents of the group consisting of furfural, ethyl acetate, formamide and dimethyl formamide, adding an organic solvent to the aqueous solution undergoing conversion to dissolve 5-hydroxymethyl furfural and the tar-like material, and separating the 5-hydroxymethyl furfural from the tar-like material.

3. In the process of claim 2, carrying out the conversion reaction in the presence of a water immiscible organic solvent for 5-hydroxymethyl furfural to effect a rapid removal of the 5-hydroxymethyl furfural from the reacted liquid.

4. In the process of claim 2, carrying out the process by continuously passing the compound solution into a reactor, and continuously withdrawing the reaction product.

5. In the process of claim 2, heating a solution containing a mixture of glucose and fructose and levulinic acid catalyst, the fructose being selectively converted to 5-hydroxymethyl furfural, and returning the solution of unconverted sugar consisting largely of glucose to the system.

6. The improved process for the conversion of a compound of the group consisting of glucose, fructose, sucrose, invert sugar, fructosans, hydrolyzed wood and starch into 5-hydroxymethyl furfural, which comprises heating a continuously flowing stream of an aqueous solution of the compound to a temperature above 250° C. but not above 380° C. for from 0.1 second to 120 seconds to form 5-hydroxymethyl furfural in high yield, and at a point in the flowing stream where there is substantial conversion of the compound introducing furfural into the solution to facilitate the separation recovery of 5-hydroxymethyl furfural.

7. In the process of claim 6, when the aqueous solution contains a sugar of the group consisting of sucrose and fructose adding levulinic acid catalyst to the solution.

References Cited in the file of this patent

UNITED STATES PATENTS 2,750,394     Peniston _____ June 12, 1956

FOREIGN PATENTS 600,871     Great Britain _____ Apr. 21, 1948

OTHER REFERENCES

Pummerer et al.: Chemical Abstracts, vol. 29, 3653[5] (1935).